United States Patent
Ali et al.

(10) Patent No.: US 10,206,417 B1
(45) Date of Patent: Feb. 19, 2019

(54) **GUAVA SEED (*PSIDIUM GUAJAVA*) NANOPARTICLES AS ANTIBACTERIAL AGENT**

(71) Applicant: KING SAUD UNIVERSITY, Riyadh (SA)

(72) Inventors: Hatem Salama Mohamed Ali, Cairo (EG); Reem Atta Alajmi, Riyadh (SA); Hany Mohamed Yehia, Riyadh (SA); Mohamed Fekry Serag El-Din, Shebin El-Kom (EG); Manal Fawzy Elkhadragy, Cairo (EG); Manal Ahmed Gasmelseed Awad, Riyadh (SA); Dina Mahmoud Metwally Hasanin, Zagzig (EG)

(73) Assignee: King Saud University, Riyadh (SA)

(*) Notice: Subject to any disclaimer, the term of this patent is extended or adjusted under 35 U.S.C. 154(b) by 0 days.

(21) Appl. No.: 16/003,042

(22) Filed: Jun. 7, 2018

(51) Int. Cl.
    B65D 81/28 (2006.01)
    A23L 3/3472 (2006.01)

(52) U.S. Cl.
    CPC ......... *A23L 3/3472* (2013.01); *A23V 2002/00* (2013.01); *B65D 81/28* (2013.01)

(58) Field of Classification Search
    None
    See application file for complete search history.

(56) References Cited

U.S. PATENT DOCUMENTS

| 9,526,754 B1 | 12/2016 | Serrano | |
| 2008/0274195 A1* | 11/2008 | Nicolosi | A61K 9/1075 424/489 |
| 2011/0190197 A1* | 8/2011 | Franco | C07K 14/415 514/2.3 |

FOREIGN PATENT DOCUMENTS

| CN | 104045420 A | 9/2014 |
| CN | 106109584 A | 11/2016 |
| CN | 106465736 A | 3/2017 |
| JP | 2006055038 A | 3/2006 |
| KR | 20150107504 A | 9/2015 |

OTHER PUBLICATIONS

Hi Castro-Vargas, Li Rodriguez-Varela, SRS Ferreira, F Parada-Alfonso. "Extraction of phenolic fraction from guava seeds (*Psidium guajava* L.) using supercritical carbon dioxide and co-solvents." Journal of Supercritical Fluids, vol. 51, 2010, pp. 319-324. (Year: 2010).*
JY Salib, HN Michael. "Cytotoxic phenylethanol glycosides from Psidium guaijava seeds." Phytochemistry, vol. 65, 2004, pp. 2091-2093. (Year: 2004).*
YP Chang, MP Tan, WL Lok, S Pakianathan, Y Supramaniam. "Making Use of Guava Seed (*Psidium guajava* L): The Effects of Pre-treatments on Its Chemical Composition." Plant Foods Human Nutrition, vol. 69, 2014, pp. 43-49. (Year: 2014).*
AMA Uchoa-Thomaz et al. "Chemical composition, fatty acid profile and bioactive compounds of guava seeds (*Psidium guajava* L.)." Food Science and Technology Campinas, vol. 34(3), Jul.-Sep. 2014, pp. 485-492. (Year: 2014).*
A Arain, STH Sherazi, Sam Sirajuddin. "Spectroscopic and chromatographic evaluation of solvent extracted guava seed oil." International Journal of Food Properties, vol. 20, No. S1, pp. S556-S563 and a title page, available online Jun. 13, 2017 (Year: 2017).*
F Wang, Y-H Chen, Y-J Zhang, G-F Deng, Z-F Zou, A-N Li, D-P Xu, H-B Li. "Chemical Components and Bioactivities of Psidium guajava." International Journal of Food Nutrition and Safety, vol. 5(2), 2014, pp. 98-114. (Year: 2014).*
KPV Kumar, MSN Pillai, GR Thusnavis. "Seed Extract of Psidium guajava as Ecofriendly Corrosion Inhibitor for Carbon Steel in Hydrochloric Acid Medium." Journal of Materials Science and Technology, vol. 27(12), 2011, pp. 1143-1149. (Year: 2011).*
PB Pelegrini et al. "Identification of a novel storage glycine-rich peptide from guava (*Psidium guajava*) seeds with activity against Gram-negative bacteria." Peptides, vol. 29, 2008, pp. 1271-1279. (Year: 2008).*
A Bernadino-Nicanor, AA Scilingo, MC Anon, G Davila-Ortiz. "Guava seed storage protein: Fractionation and characterization." LWT, vol. 39, 2006, pp. 902-910. (Year: 2006).*
T Hintz, KK Matthews, R Di. "The Use of Plant Antimicrobial Compounds for Food Preservation." Handawi Publishing Corporation, BioMed Research International vol. 2015, Article ID 246264, pp. 1-12, published 2015. (Year: 2015).*
K Ravi, P Divyashree. "Psidiunn guajava: A review on its potential as an adjunct in treating periodontal disease." Pharmacognosy Review, vol. 8(16), Jul.-Dec. 2014, Pubmed Central Copy—PMID 25125881 and PMCID: PMC4127827, 10 printed pages. ( Year: 2014).*
Braga et al., "Antioxidant, Antibacterial and Antitumor Activity of Ethanolic Extract of the Psidium guajave Leaves", American Journal of Plant Sciences, Nov. 2014, 5, 3492-3500.
Valencia-Leal, S.A. et al., "Evaluation of Guava Seeds (*Psidium guajava*) as a Low Cost Biosorbent for the Removal of Fluoride from Aqueous Solutions", International Journal of Engineering Research and Development, Dec. 2012, vol. 5, Issue 4, pp. 69-76.
Madhumitha, G., et al., "Devastated Crops: Multifunctional Efficacy for the Production of Nanoparticles", Journal of Nanomaterials, 2013, Article ID 951858, pp. 1-12.

* cited by examiner

*Primary Examiner* — Isaac Shomer
(74) *Attorney, Agent, or Firm* — Richard C. Litman

(57) ABSTRACT

The guava seed (*Psidium guajava*) nanoparticles as an antibacterial agent are prepared from guava seeds that have been washed, dried, and ground to powder of less than 1 mm diameter. The powder is reduced to nanoparticle size (less than 100 nm diameter) by adding the powder to a solution of concentrated hydrochloric acid (38% w/w) and stirring the mixture at 3000 rpm at room temperature. The resulting nanoparticles are filtered through a Millipore membrane filter and dried. Agar well diffusion studies showed significant antibacterial activity against various Gram positive and negative species commonly implicated in food contamination. Further testing showed the guava seed nanoparticles have significant antioxidant and radical scavenging content, suggesting that guava seed nanoparticles may serve as an antibacterial agent.

5 Claims, 1 Drawing Sheet

GUAVA SEED (*PSIDIUM GUAJAVA*) NANOPARTICLES AS ANTIBACTERIAL AGENT

BACKGROUND

1. Field

The disclosure of the present patent application relates to nanotechnology, and particularly to guava seed (*Psidium guajava*) nanoparticles as an antibacterial agent.

2. Description of the Related Art

Nanoscience is one of the most important research and development frontiers in modern science. In recent years, nanotechnology research is emerging as a cutting edge technology spanning the disciplines of physics, chemistry, biology, material science, and medicine.

Guava (*Psidium guajava*) seeds are considered to be a solid waste produced in great quantities by agricultural and industrial activities in various parts of Mexico. Guava seeds are composed of compounds with structural properties that make them suitable for use as biosorbents. The high content of cellulose, lignin, and protein, for example, make the components particularly useful for anionic contaminants that may otherwise be present in water. Guava seeds have been used as a biosorbent for removal of Cr(VI) from aqueous solutions, presenting acceptable sorption capacity. It would be desirable to find additional uses for guava seeds, which otherwise present a waste disposal problem.

Thus, guava seed (*Psidium guajava*) nanoparticles as an antibacterial agent solving the aforementioned problems is desired.

SUMMARY

The guava seed (*Psidium guajava*) nanoparticles as an antibacterial agent are prepared from guava seeds that have been washed, dried, and ground to powder of less than 1 mm diameter. The powder is reduced to nanoparticle size (less than 100 nm diameter) by adding the powder to a solution of concentrated hydrochloric acid (38% w/w) and stirring the mixture at 3000 rpm at room temperature. The resulting nanoparticles are filtered and dried. Agar well diffusion studies showed significant antibacterial activity against various Gram positive and negative species commonly implicated in food contamination. Further testing showed the guava seed nanoparticles have significant antioxidant and radical scavenging content, suggesting that guava seed nanoparticles may serve as an antibacterial agent.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The guava seed (*Psidium guajava*) nanoparticles as an antibacterial agent are prepared from guava seeds that have been washed, dried, and ground to powder of less than 1 mm diameter. The powder is reduced to nanoparticle size (less than 100 nm diameter) by adding the powder to a solution of concentrated hydrochloric acid (38% w/w) and stirring the mixture at 3000 rpm at room temperature. The resulting nanoparticles are filtered and dried. Agar well diffusion studies showed significant antibacterial activity against various Gram positive and negative species commonly implicated in food contamination. Further testing showed the guava seed nanoparticles have significant antioxidant and radical scavenging content, suggesting that guava seed nanoparticles may serve as an antibacterial agent.

The guava seed (*Psidium guajava*) nanoparticles as an antibacterial agent will be better understood by reference to the following working examples.

Example 1

Guava Seed Preparation

Guava seeds were obtained from local markets in Riyadh, Saudi Arabia. The seeds were washed with distilled water, and then dried at 60° C. for 12 hours. The seeds were then ground. Ground seed particles of the desired size were separated using a sieve of 0.355 mm (U.S.A Standard Sieve—ASTM-E 11) and kept in a closed container. These ground seeds were used and are referred to herein as the "normal" ground guava seeds, or were further processed as described below to prepare the guava seed nanoparticles.

Example 2

Figure 1A:
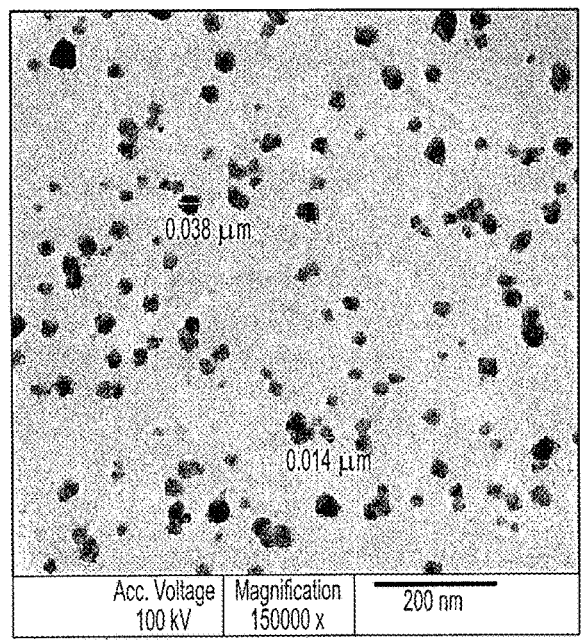
FIG. 1A is a transmission electron microscopy (TEM) micrograph of the guava seed nanoparticles, size 14-45 nm, at 150,000× magnification.
Figure 1B:
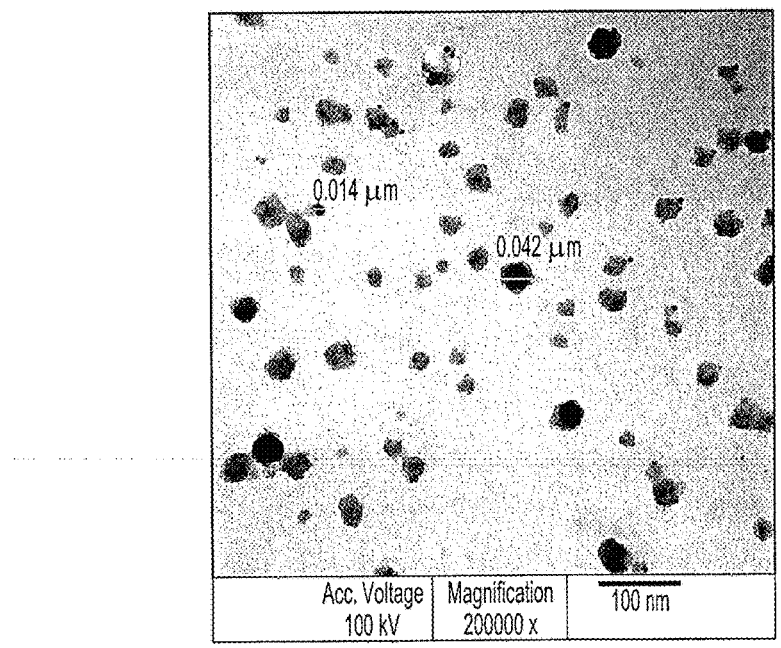
FIG. 1B is a TEM micrograph of the guava seed nanoparticles, size 14-45 nm, at 200,000× magnification.

Preparation of Guava Seed Nanoparticles in Detail 1 gram of the normal guava seed powder from the above was weighed out and added to 30 ml of methanol and 1-3 ml of 38% hydrochloric acid and was kept under stirring at a speed of 3000 rpm at 30±2° C. for one hour, and then 20 ml of distilled water was added with continuous stirring for an additional 2 hours. The nanoparticles were centrifuged (9000 rpm) for 15 minutes, filtered (to collect the nanoparticles) and dried. The resulting nanoparticles were characterized by transmission electron microscopy (JEM-1011, JEOL, Japan), as shown in FIGS. 1A and 1B. The size of the nanoparticles was analyzed through Zetasizer Nano series, HT Laser, ZEN3600 (Malvern Instrument, UK).

Example 3

Antimicrobial Testing

The nanoparticles prepared according to Example 2 were tested for antibacterial or antimicrobial activity against the following strains: *Bacillus cereus* ATCC 14579; *Bacillus subtilis spizizenii* ATCC 6633; *Bacillus subtilis* (local isolate); *Klebsiella pneumoniae* ATCC 10031; *Listeria monocytogenes* ATCC 19114; *Staphylococcus aureus* ATCC 29737; *Staphylococcus aureus* (MRSA), (local isolate); *Proteus* sp. (local isolate); *Pseudomonas* sp. (local isolate); *Serratia marcescens* (local isolate); *Salmonella typhimurium* ATCC 14028; *Salmonella infantis* ATCC 14028; and *Escherichia coli* ATCC 10536.

The agar diffusion method was used to determine the antibacterial activity of the guava nanoparticles against the foodborne and contamination bacteria listed above. The bacterial strains were grown on Brain Heart Infusion Agar (Oxoid™ CM 1136) for 24 hours, at 37° C. One hundred microliters, at a concentration of $10^6$/ml of each active bacterial strain was spread on the surface of Muller Hinton agar plates (Oxoid CM 0337).

100 mg/ml of guava nanoparticles, and "normal" guava seed particles, were dissolved separately in sterilized water, and left overnight in the refrigerator. Then, three holes were made in each agar plate, using a sterile cork borer with a diameter of 6 mm to punch the holes in the agar. In each agar plate, 50 µL was introduced separately into each hole, as follows: the guava nanoparticle solution (Gn); or normal guava dissolved in water (G) as control; or plain water (C). Then, the agar plates were incubated at 37° C., for 24 hours. Zones of inhibition were measured and compared for each test preparation (Gn, G, or C) vs. each bacterial strain tested.

The data in Table 1 demonstrate the effect of the guava nanoparticles and normal guava on the various bacteria tested. The guava nanoparticles were generally more effective on both Gram positive and Gram negative bacteria than the normal guava, which only demonstrated efficacy against one bacterial strain. However, two of the Gram negative bacteria tested, i.e., *Escherichia coli* ATCC10536 and *Pseudomonas* sp. (local isolate), were apparently not affected by either of the two guava solutions. The effective ratio was 84.61% for the nanoparticles, and 7.69% for the normal guava particles. See Table 1.

TABLE 1

Antimicrobial testing

| Microorganism | Zone of inhibition (in mm) | |
|---|---|---|
| | Guava seed nano-particles | Normal guava seed particles |
| *Bacillus cereus* ATCC 14579 (Gram +) | 15 | — |
| *Bacillus subtilis spizizenii* ATCC 6633 (Gram +) | 25 | — |
| *Bacillus subtilis* (local isolate) (Gram +) | 22 | 8 |
| *Klebsiella pneumoniae* ATCC 10031 (Gram −) | 15 | — |
| *Listeria monocytogenes* ATCC 19114 (Gram +) | 25 | — |
| *Staphylococcus aureus* ATCC 29737 (Gram +) | 20 | — |
| *Staphylococcus aureus* (MRSA), (local isolate) Gram + | 25 | — |
| *Proteus* sp., (local isolate) (Gram −) | 25 | — |
| *Pseudomonas* sp. (local isolate) (Gram −) | — | — |
| *Serratia marcescens* (local isolate) (Gram −) | 15 | — |
| *Salmonella typhimurium* ATCC 14028 (Gram −) | 14028 | 12 |
| *Salmonella infantis* ATCC 14028 (Gram −) | 12 | — |
| *E. coli* ATCC 10536 (Gram −) | — | — |
| Effective ratio | 84.61 | 7.69 |

Example 4

Preparation of Methanol Extracts

Methanolic extracts of nanoparticles and normal particles of guava seed were prepared as follows. 400 mg of ground seed or of nanoparticles were added to 50 ml methanol. The mixture was left on a shaker for 24 hours, and then centrifuged at 10,000 rpm for 15 minutes. The supernatant was filtered using Whatman™ filter papers, grade 41. The supernatant was adjusted to 50 ml, and stored at −20° C. for up to one week for use.

Example 5

Testing for Total Phenolic Compounds

The total phenolic compound content in a methanol extract of the guava seed nanoparticle was determined by the Folin-Ciocalteu method. 2.5 ml of distilled water and 0.1 ml of a sample extract were added to a test tube, followed by the addition of 0.1 ml of undiluted, commercially available Folin-Ciocalteu reagent (Sigma-Aldrich, St. Louis, Mo., USA). The solution was mixed well, and allowed to stand for 6 minutes before 0.5 ml of 20% sodium carbonate solution was added. The color was developed for 30 minutes at room temperature (20° C.), and the absorbance was measured at 760 nm using a spectrophotometer (Milton Roy Spectronic 1201, USA). A blank sample was prepared using 0.1 ml of methanol instead of the methanol extract. The measurement was compared to a calibration curve of gallic acid solutions, and expressed as gallic acid equivalents per gram of dry weight sample.

The results are reported in Table 2. Total phenols was equivalent to about 197.5 mg gallic acid/gram of sample for the nanoparticles, compared to 152 mg gallic acid/gram of sample for the normal particles.

TABLE 2

Methanol extracts - content of phenolic compounds and flavonoids

| Methanolic Extract | T. Phenols (mg Gallic acid/g sample) M ± SD | T. Flavonoids (mg Catechin/g sample) M ± SD | T. Flavonoids (mg Rutin/g sample) M ± SD |
|---|---|---|---|
| Guava nanoparticles | 197.5 ± 2.393 | 1.996 ± 0.041 | 13.528 ± 0.457 |
| Guava particles | 151.962 ± 2.763 | 1.664 ± 0.048 | 11.274 ± 0.528 |

Values are means of three replications, ± standard deviation.

Example 6

Testing for Flavonoid Content

The total flavonoid content of a methanol extract of the guava seed nanoparticles was determined by the aluminum chloride colorimetric method. 50 µL of methanol extract was mixed with 4 mL of distilled water and then 0.3 mL of 5% $NaNO_2$ solution. After incubation for 5 minutes, 0.3 mL of 10% $AlCl_3$ solution was added, and the mixture was allowed to stand for 6 minutes. Then, 2 mL of 1M NaOH solution was added, and distilled water was added to bring the final volume of the mixture to 10 mL. The mixture was allowed to stand for 15 minutes, and absorbance was measured at 510 nm. The total flavonoid content was calculated from a calibration curve, and the result was expressed as mg rutin equivalent per g dry weight, and as mg catechin equivalent per g dry weight.

The results are reported in Table 2. Total flavonoids for the guava nanoparticles was equivalent to about 2 mg catechin/g sample, or about 13.5 mg rutin/g sample, compared to 1.7 mg catechin, and 11.2 mg rutin, per gram of sample for the normal guava particles.

Example 7

DPPH (2,2-diphenyl-1-picrylhydrazyl) radical scavenging activity

Each sample was tested for the ability to scavenge DPPH radical. A 0.08 mM DPPH radical solution in methanol was prepared. 950 µL of the DPPH stock solution was added to 50 µL of the guava seed nanoparticle extract, and the mixture was incubated for 5 minutes. Exactly 5 minutes later, absorbance readings were performed on the mixture at 515 nm (Cary 50 Scan; Varian). Antioxidant activity (AA) was expressed as the percentage inhibition of DPPH radical by using this equation:

$$AA = 100 - [100 \times (A\ sample/A\ control)]$$

where A sample is the absorbance of the sample at t=5 min, and A control is the absorbance of the control.

The results are reported in Table 3. The nanoparticles exhibited 97.5% inhibition of DPPH radical, compared to about 91% inhibition by the normal guava particles.

TABLE 3

Methanolic extracts - free-radical scavenging and antioxidant power

| Methanolic Extract | DPPH (%) M ± SD | ABTS (mmol Trolox/g sample) M ± SD | FRAP (mmol Trolox/g sample) M ± SD |
|---|---|---|---|
| Guava nanoparticles | 97.5 ± 0.281 | 22.473 ± 0.194 | 11.773 ± 0.082 |
| Guava particles | 90.93 ± 0.273 | 16.647 ± 0.344 | 9.650 ± 0.053 |

Values are means of three replications, ± standard deviation.

Example 8

ABTS (2,4,6-Tri(2-Pyridyl)-s-triazine) radical scavenging activity

The ABTS assay used was determined according to the method of Gouveia and Castilho (2011). The ABTS radical solution was prepared by reacting 50 mL of 2 mM ABTS solution with 200 µL of 70 mM potassium persulfate solution. This mixture was stored in the dark for 16 hours at room temperature, and it was stable in this form for two days. For each analysis, the ABTS solution was diluted with pH 7.4 phosphate buffered saline (PBS) solution to an initial absorbance of 0.700±0.021, at 734 nm.

This solution was newly prepared for each set of analyses. To determine the antiradical scavenging activity, an aliquot of 100 µL methanolic solution was added to 1.8 mL of ABTS solution, and the absorbance decrease at 734 nm was recorded during the next 6 minutes. Results were expressed as µmol Trolox equivalent per g of dried sample (mmol eq. Trolox/g), based on the Trolox calibration curve.

The results are reported in Table 3. The nanoparticles exhibited the equivalent of about 22.5 mmol Trolox per gram of dried sample, compared to about 16.5 mmol for the normal guava particles.

Example 9

Ferric Reducing Antioxidant Power (FRAP)

The ferric reducing antioxidant power (FRAP) was measured. The FRAP reagent included 300 mM acetate buffer at pH 3.6; 10 mM TPTZ in 40 mM HCl; and 20 mM $FeCl_3$ in the ratio 10:1:1 (v/v/v). Three ml of the FRAP reagent was mixed with 100 µL of the sample extract in a test tube, and vortexed in the incubator at 37° C. for 30 minutes in a water bath. Reduction of ferric-tripyridyltriazine to the ferrous complex formed an intense blue color, which was measured on a UV-vis spectrophotometer (Varian Cary 50) at 593 nm after 4 minutes. Results were expressed in terms of mmol Trolox equivalent per g of dried sample (mmol eq. Trolox/g).

The results are reported in Table 3. The nanoparticles exhibited the equivalent of about 11.8 mmol Trolox per gram of dried sample, compared to about 9.6 mmol for the normal guava particles.

It is to be understood that the synthesis of guava seed (*Psidium guajava*) nanoparticles and their use as an antibacterial agent is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making antibacterial guava seed nanoparticles, comprising the steps of:
   grinding guava (*Psidium guajava*) seeds to form a guava seed powder;
   adding the guava seed powder to 30 ml of methanol and 1-3 ml of concentrated hydrochloric acid to form a mixture, wherein the concentrated hydrochloric acid is 38% HCl:water w/w;
   stirring the mixture of guava seed powder and concentrated hydrochloric acid to form guava seed nanoparticles, wherein the stirring is at 3000 rpm at about 30° C. for one hour;
   adding 20 ml of distilled water to the stirred mixture and subsequently continuing the stirring for two hours;
   centrifuging the nanoparticles at 9000 rpm for 15 minutes; and
   filtering and drying the guava seed nanoparticles, wherein the guava seed nanoparticles have an average diameter less than 100 nm.

2. The method of making guava seed nanoparticles according to claim 1, wherein said step of grinding guava (*Psidium guajava*) seeds further comprises filtering the ground guava seeds through a sieve having a pore size of 0.355 mm to obtain the guava seed powder.

3. Guava (*Psidium guajava*) seed nanoparticles made according to the method of claim 1.

4. A method of preventing bacterial contamination of food, comprising the step of treating the food with guava seed nanoparticles made according to the method of claim 1.

5. A method of preventing bacterial contamination of food, comprising the step of packaging the food in packaging incorporating guava seed nanoparticles made according to the method of claim 1.

* * * * *